United States Patent [19]

Horton

[11] Patent Number: 4,947,927

[45] Date of Patent: Aug. 14, 1990

[54] METHOD OF CASTING A REACTIVE METAL AGAINST A SURFACE FORMED FROM AN IMPROVED SLURRY CONTAINING YTTRIA

[75] Inventor: Robert A. Horton, Chesterland, Ohio

[73] Assignee: PCC Airfoils, Inc., Cleveland, Ohio

[21] Appl. No.: 433,526

[22] Filed: Nov. 8, 1989

[51] Int. Cl.$^5$ .............................................. B22C 1/02
[52] U.S. Cl. ...................................... 164/517; 164/516
[58] Field of Search ................ 164/14, 520, 522, 516, 164/517, 138; 106/38.22

[56] References Cited

U.S. PATENT DOCUMENTS

| | | | |
|---|---|---|---|
| 3,955,616 | 5/1976 | Gigliotti, Jr. et al. | 164/361 |
| 4,063,954 | 12/1977 | Brown | 164/23 |
| 4,578,487 | 3/1986 | Barfurth et al. | 556/40 |
| 4,703,806 | 11/1987 | Lassow et al. | 164/518 |
| 4,787,439 | 11/1988 | Feagin | 164/35 |
| 4,799,532 | 1/1989 | Mizuhara | 164/335 |

OTHER PUBLICATIONS

Publication by E. D. Calvert and entitled "An Investment Mold for Titanium Castings", Bureau of Mines, Report of Investigation 8541.

Primary Examiner—Richard K. Seidel
Assistant Examiner—Rex E. Pelto
Attorney, Agent, or Firm—Tarolli, Sundheim & Covell

[57] ABSTRACT

Reactive metals, such as titanium or nickel-chrome superalloys containing rare earths, are cast with mold and/or core surface areas formed from an improved slurry. The improved slurry contains yttria to form an inert surface which is exposed to the molten reactive metal. In order to prevent premature gelation of the slurry, the forming of defects in the mold and/or core surface areas, and the forming of defects in the cast article, the slurry contains a source of hydroxyl ions. The source of hydroxyl ions is sufficient to result in the slurry having a pH of at least 10.2 six days after initially mixing the slurry. The source of hydroxyl ions may be a metal alkali or an organic hydroxide. It is believed that the source of hydroxyl ions functions as a hydration suppressant for the yttria to prevent premature gelation of the slurry. The slurry contains a silicon oxide ($SiO_2$) to alkali ratio which is equivalent to a silicon oxide to sodium oxide ($Na_2O$) dry weight ratio of less than thirty-to-one (30:1).

20 Claims, 1 Drawing Sheet

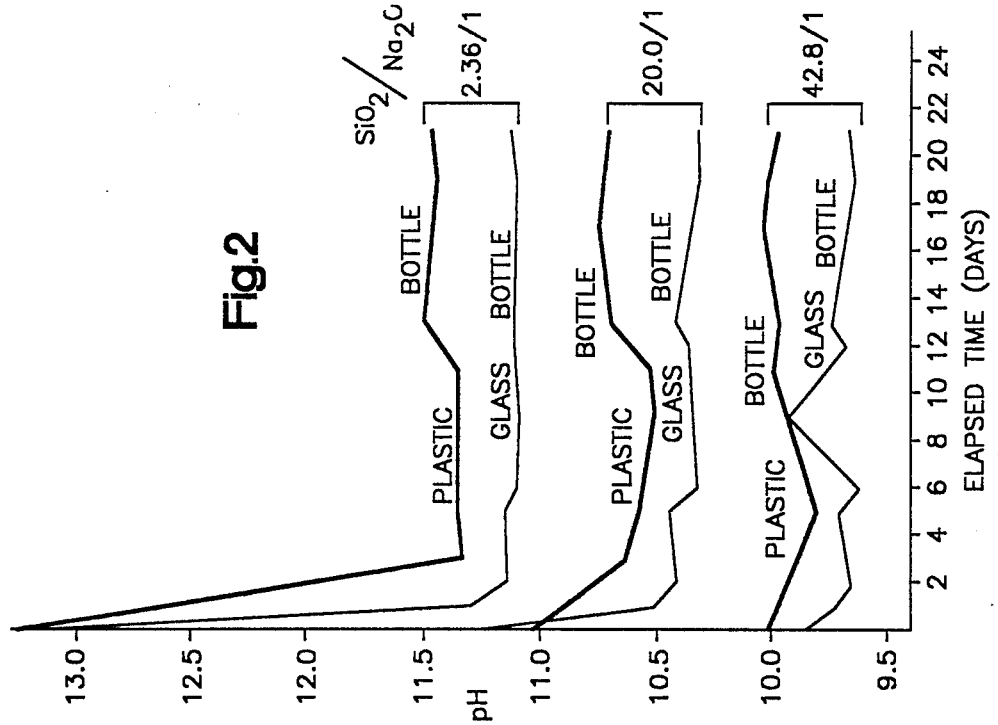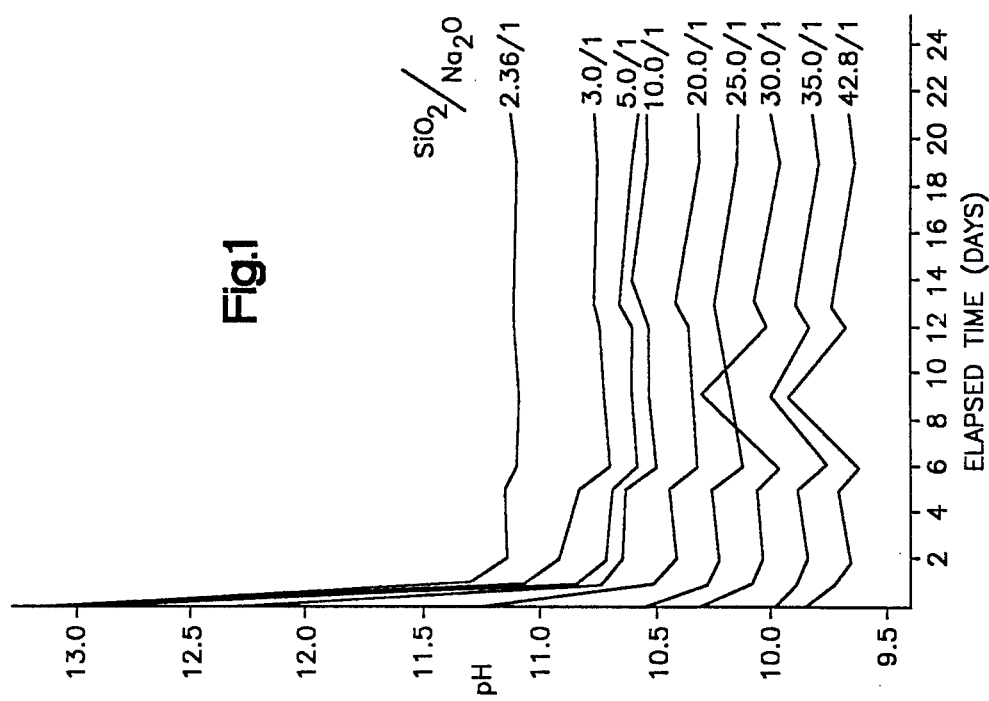

METHOD OF CASTING A REACTIVE METAL AGAINST A SURFACE FORMED FROM AN IMPROVED SLURRY CONTAINING YTTRIA

BACKGROUND OF THE INVENTION

The present invention relates to a yttria containing water-base refractory slurry which is not subject to premature gelation and which can be used to form defect free molds and castings.

Yttria (yttrium oxide, $Y_2O_3$), because of its refractoriness and chemical inertness, is a very desirable refractory for use as a face coat on molds or a coating on cores for use in casting reactive metals. This is because reactive metals or alloys tend to react with many known molds in such a manner as to form defective castings.

Colloidal silica is a very desirable and widely used binder for investment casting molds. The colloidal silicas ($SiO_2$) usually used on a commerical basis have a silica content of approximately 30 percent. These known colloidal silicas are stabilized by an alkali (usually sodium oxide), and have an average silica particle size of either 7 or 14 mu (millimicrons). Colloidal silica is relatively inexpensive, stable, possesses excellent room temperature bonding characteristics, provides continuous bonding during all stages of the process, does not present a fire hazard and does not involve the use of organic solvents.

It would appear obvious to use yttria powder as part, or all, of the face coat refractory along with colloidal silica binder in the making of molds and/or cores for use with reactive metals. This is especially true for investment casting molds which are commonly made from colloidal silica. However, previous attempts to do this have been unsuccessful.

The problems involved in attempting to use yttria with colloidal silica have been well documented by Lassow et al. in U.S. Pat. No. 4,703,806 issued Nov. 3, 1987 and entitled "Ceramic Shell Mold Facecoat and Core Coating Systems for Reactive Casting of Reactive Metals". This patent reports the efforts of various investigators who were unsuccessful in using colloidal silica, as well as other water base refractory binders, with yttria powder. Some of these efforts are reported in the following three paragraphs from bottom of column 1 and the top of column 2 of U.S. Pat. No. 4,703,806:

For a number of years, yttria ($Y_2O_3$) has been investigated as a possible mold facecoat material because of its low reactivity with respect to titanium. To make application of yttria economical, investigators have tried yttria-based slurries. Heretofore, however, investigators have been unsuccessful in using yttria-based slurries as mold facecoat materials in the fabrication of molds for casting reactive metals.

For example in 1976, Schuyler et al. reported the results of tests using fine particle yttria dispersed in colloidal potassium silicate solution to which coarse yttria has been added as a mold facecoat material. D. R. Schuyler, et al., "Development of Titanium Alloy Casting Technology," AFML-TR-76-80, Aug. 1976, pp. 275-279. The molds made with this facecoat material were not satisfactory. Schuyler et al. reported that "the facecoat was not as smooth as normal for the standard foundry system. Pores and pits were present, and the stucco showed through in many places." Schuyler et al. also tried a slurry containing yttria, titania and colloidal silica. Schuyler et al. found that with this system the facecoat surface was even more highly pitted.

It is particularly relevant to note that U.S. Pat. No. 4,703,806 teaches that a mold facecoat composition which comprises yttria powder and aqueous colloidal silica binder results in slurries which exhibit rapid and premature gelation. These slurries result in mold facecoats which tend to crack and/or spall during mold firing. As a result, U.S. Pat. No. 4,703,806 proposes to solve the problems resulting from using yttria powder with aqueous colloidal silica binder by using yttria with a non-aqueous binder. Ethyl silicate is suggested by the patent as being a preferred binder. However, other non-aqueous binders are also disclosed. In addition, U.S. Pat. No. 4,578,487 issued March 25, 1986 to Barfurth et al. and entitled "Binding Agents Containing Titanic Acid Esters for the Preparation of Coating Compositions and Refractory Bodies, and a Method for Preparation of These Binding Agents" suggests the use of a chelated organic titanium compound as a binder. This patent indicates that the chelated organic titanium compound can be used as a binder with yttria.

All of these non-aqueous refractory binders are more expensive than an aqueous based refractory binder. In addition, the non-aqueous binders suggested by the aforementioned prior art patents present fire and environmental hazards. The slurries which are made by using these non-aqueous refractory binders present stability problems since the slurries are sensitive to moisture which can be picked up from the atmosphere. In addition, slurries which have non-aqueous refractory binders have poor dipping/draining characteristics which tend to result in poor, non-uniform coatings.

SUMMARY OF THE PRESENT INVENTION

The present invention provides a slurry formed from an aqueous binder and yttria. The slurry contains a source of hydroxyl ions. The source of hydroxyl ions prevents premature gelation of the slurry and results in the slurry having a pH of at least 10.2 six days after the slurry is initially mixed. The dry weight ratio of the binder to the source of hydroxyl ions is equivalent to a silicon oxide ($SiO_2$) to sodium oxide dry weight ratio of less than thirty-to-one (30:1). It has been determined that the slurry may be maintained for many months with only periodic agitation to maintain the solid particles of the slurry in suspension.

Defect free molds containing surface areas formed from the slurry can be made. These molds can withstand firing at high temperatures without spalling or cracking. It is theorized that the source of hydroxyl ions is effective to suppress hydration of the yttria in the slurry to thereby prevent premature gelation of the slurry and to prevent the forming of defects in a surface formed from the slurry during drying and/or firing of the surface.

The slurry which is formed in accordance with the present invention may be used to form a mold containing a surface area which is exposed to a reactive metal during casting. This surface area may be on an inner side surface of the mold, or on an outer side surface of a core disposed in the mold, or on a crucible or crucible liner. When a reactive molten metal is conducted into the mold, it engages the surface area formed from the slurry. However, due to the presence of the relatively inert yttria, there is no reaction between the metal and the surface area formed from the slurry.

Accordingly, it is an object of this invention to provide an aqueous based slurry containing yttria and which is not subject to premature gelation and which can be used to form surfaces which do not crack or spall during firing and/or use during casting of reactive metals.

Another object of this invention is to provide a new and improved method of casting an article of a reactive metal wherein a mold contains a surface area formed from a slurry containing water, a binder, a source of hydroxyl ions and yttria.

Another object of this invention is to provide a new and improved method of casting a plurality of articles of reactive metal wherein molds are sequentially formed from a slurry over a substantial length of time after the slurry is initially formed and wherein the slurry contains water, a binder, a source of hydroxyl ions and yttria.

Another object of this invention is to provide a new and improved slurry for use in forming a surface which is engaged by reactive metal and wherein the slurry contains water, a binder, a source of hydroxyl ions and yttria and wherein the slurry is not subject to premature gelation.

BRIEF DESCRIPTION OF THE DRAWINGS

The foregoing and other objects and features of the present invention will become more apparent upon a consideration of the following description taken in connection with the accompanying drawings wherein:

FIG. 1 is a graph illustrating the variation of pH with time and as a function of the equivalent dry weight ratio of silicon oxide ($SiO_2$) to sodium oxide ($Na_2O$) for samples held in glass bottles; and FIG. 2 is a graph illustrating the difference between the pH of some samples of FIG. 1 held in glass bottles to the same samples held in plastic bottles.

DESCRIPTION OF SPECIFIC PREFERRED EMBODIMENTS OF THE INVENTION

General Description

An aqueous slurry having a composition in accordance with the present invention contains water, a binder, a source of hydroxyl ions and yttria ($Y_2O_3$). The slurry may also contain other known additives. For example, the slurry could contain suitable film formers, such as alginates to control viscosity and wetting agents to control flow characteristics and pattern wettability.

The hydroxyl ions in the slurry prevent premature gelation of the slurry. It is theorized that the hydroxyl ions prevent premature gelation of the slurry by suppressing hydration of the yttria. However, it should be understood that there could be other reasons for the hydroxyl ions preventing premature gelation of the slurry.

The source of the hydroxyl ions can be either a metallic hydroxide or an organic hydroxide. When the source of hydroxyl ions is a metallic hydroxide, alkali metal hydroxides, such as sodium hydroxide, potassium hydroxide or lithium hydroxide may be used. When the source of hydroxyl ions is to be an organic hydroxide, the source may be tetramethyl ammonium hydroxide, tetraethyl ammonium hydroxide, tetraethanol ammonium hydroxide or equivalent organic hydroxides. If desired, ammonium hydroxide could be used as the source of hydroxyl ions.

The binder in the slurry could be any one of the many known alkaline binders. However, it is preferred to use colloidal silica ($SiO_2$) due to its superior binding properties. Although it is preferred to use silica as the binder material in the slurry, alumina or other binders could be used. It is presently preferred to use any one of many commerical colloidal silicas or polysilicates as the binder. Some commercial alkaline aqueous silica binders are as follows:

| | | | COMMERCIAL COLLOIDAL SILICAS (AND POLYSILICATES) | | | | |
|---|---|---|---|---|---|---|---|
| | Particle | % | Stabilizing Ion | | | | Weight Ratio |
| Grade | Size | $SiO_2$ | Type | % | Other | pH | $SiO_2$/Alkali |
| Dupont Ludox HS-40 | 12 | 40 | $Na_2O$ | 0.41 | — | 9.7 | 95 |
| Dupont Ludox HS-30 | 12 | 30 | $Na_2O$ | 0.32 | — | 9.8 | 95 |
| Dupont Ludox TM | 22 | 50 | $Na_2O$ | 0.21 | — | 9.1 | 220 |
| Dupont Ludox SM | 7 | 30 | $Na_2O$ | 0.56 | — | 10.0 | 50 |
| Dupont Ludox AM | 12 | 30 | $Na_2O$ | 0.24 | Surface aluminate ions | 8.8 | 125 |
| Dupont Ludox AS | 22 | 50 | $NH_3$ | 0.16 | 0.08 $Na_2O$ | 9.1 | 270 |
| Dupont Ludox LS | 22 | 30 | $Na_2O$ | 0.10 | — | 8.1 | 280 |
| Dupont Ludox CL-X | 22 | 46 | $Na_2O$ | 0.19 | — | 9.2 | 230 |
| Dupont Polysilicate 48 | | 20 | $LiO_2$ | 2.1 | — | 11 | 10/1 |
| Dupont Polysilicate 85 | | 20 | $LiO_2$ | 1.2 | — | 11 | 17/1 |
| Nyacol 215 | 3–4 | 15 | $Na_2O$ | 0.83 | — | 11 | 18/1 |
| Nyacol 830 | 8 | 30 | $Na_2O$ | 0.55 | — | 10.5 | 56 |
| Nyacol 1430 | 14 | 30 | $Na_2O$ | 0.40 | — | 10.3 | 75 |
| Nyacol 1440 | 14 | 40 | $Na_2O$ | 0.48 | — | 10.4 | 83 |
| Nyacol 2050 | 20 | 50 | $Na_2O$ | 0.47 | — | 10 | 106 |
| Nyacol 2050 | 20 | 40 | $Na_2O$ | 0.38 | — | 10 | 105 |
| Nyacol 5050 | 50 | 50 | $Na_2O$ | 0.15 | — | 9.3 | 333 |
| Nyacol 9950 | 100 | 50 | $Na_2O$ | 0.12 | — | 9.0 | 417 |
| Nyacol 2040$NH_4$ | 20 | 40 | $NH_3$ | 0.2 | — | 9.0 | 200 |
| Nyacol 2046EC | 20 | 46 | $Na_2O$ | 0.42 | — | 10 | 110 |
| Nalcoag 1130 | 8 | 30 | $Na_2O$ | 0.70 | — | 10 | 43 |
| Nalcoag 1030 | 11–16 | 30 | $Na_2O$ | | | 10.2 | |

Where the alkalinity of the commercial colloidal silica or polysilicate is great enough, the commercial colloidal silica or polysilicate could, itself, be the source of the hydroxyl ions. Thus, Dupont Polysilicate 48, Dupont Polysilicate 84 or Nyacol 215 could be used without providing an additional source of hydroxyl ions. However, it is contemplated that a separate source of hydroxyl ions will usually be provided.

The slurry is preferably made of commercially available colloidal silicas of the type normally used for investment casting. These are aqueous, alkaline sols containing up to about 50% silica (usually 30% $SiO_2$), stabilized with an alkali (usually $Na_2O$, although ammonia stabilized is available), and having a pH in the range of about 8.0 to 10.5. Water is used to dilute the colloidal silica and reduce the silica concentration, and a water soluble base (alkali) is added to make the resulting binder compatible with the yttria powder which is added as the slurry refractory. Other additives of the type normally used in colloidal silica base slurries, such as wetting agents, antifoam agents, organic film formers, etc., can also be added.

The resulting slurry will contain two sources of alkali, that is, the sodium in the commercially available colloidal silica (usually expressed as $Na_2O$ in the manufacturer's literature) and the extra alkali added to provide compatibility with the yttria. The higher the sodium content of the colloidal silica, the lower the amount of additional alkali required. If a commercially available colloidal silica having a relatively large sodium content is used, it may not be necessary to add additional alkali.

The alkaline materials which may be added to commercially available colloidal silica are preferably strong organic bases, such as the class of compounds known as quaternary ammonium hydroxides. These compounds are very strong bases, generally comparable in strength to sodium hydroxide and other alkali metal hydroxides. However, the ammonium hydroxides, unlike the alkali metal hydroxides, burn off completely when the mold and/or core is fired, leaving no low melting residue to detract from the refractoriness or inertness of the mold.

Examples of commercially available quaternary ammonium hydroxides which have been used include: tetramethylammonium hydroxide, tetraethylammonium hydroxide, tetrapropolyammonium hydroxide, tetrabutylammonium hydroxide, and triethylphenylammonium hydroxide. It is contemplated that hexodecyltrimethylammonium hydroxide may also be used. Of course, many other quaternary ammonium hydroxides may be used, if desired. In some cases, a weaker base may be used.

In cases where a higher amount of alkali metal oxide residue can be tolerated in the fired mold, core, crucible and/or other surface, an alkali metal hydroxide such as sodium hydroxide, potassium hydroxide, lithium hydroxide, or other, can be used in place of the relatively expensive organic bases previously mentioned. However, when the slurry of this invention is used for a facecoat for casting alloys having high melting temperatures, organic bases which leave no residue may be preferred. If desired, a virtually soda-free slurry can be formed using a commercially available ammonia stabilized colloidal silica and adding sufficient organic base to make the slurry compatible with the yttria powder.

The yttrria used in the slurry is commerically available. The preferred yttria is a densified powder, prepared by sintering or fusing, and then grinding. The yttria provides a nonreactive material for surfaces in a mold which are engaged by a reactive metal. Thus, the yttria can be disposed in a surface area of a mold which defines a mold cavity or may be disposed in a surface area on a core which is located within the mold. When a reactive molten metal is poured into a mold containing a surface area formed from the slurry, the reactive molten metal does not interact with the surface area due to the presence of the inert yttria.

Reactive metals are metals which tend to react with many known molds in such a manner as to cause the formation of a defective casting. The defects in the casting can be the result of many different causes. Thus, the defects in the casting can be the result of deterioration of the mold. With some reactive metals, the defects may be the result of one or more elements of the molten reactive metal combining with a mold material. This can result in the casting containing less than the desired amount of the reactive element or having an uneven distribution of the reactive element or it can result in unwanted elements being taken into the alloy. Of course, the reactive metal may react with the known molds in such a manner as to form defects in the coating.

Among the well known reactive metals is titanium and titanium alloys. Titanium and titanium alloys tend to react with many known mold materials in such a manner as to cause defects in the casting. For example, the titanium or titanium alloys may react with the mold material to cause reaction zones, blow holes, porosity and/or a brittle case on the casting.

Nickel-chrome superalloys also tend to react with many known mold materials. Thus, a nickel-chrome superalloy containing yttrium reacts with known molds in such a manner as to result in castings containing a very uneven distribution of yttrium. Due to the reaction of the molten metal with the mold, at least some portions of the casting will contain substantially less than the desired amount of yttrium even though the molten metal itself originally contains substantially more than the desired amount of yttrium. Although molds constructed in accordance with the present invention eliminate or at least minimize problems encountered in casting, nickel-chrome superalloys containing yttrium, it should be understood that molds constructed in accordance with the present invention can be used during the casting of nickel-chrome superalloys containing reactive elements other than yttrium.

Other reactive metals include zirconium and zirconium alloys and high carbon steels. Alloys containing substantial amounts of tungsten, hafnium, carbon, nickel, cobalt, etc. also tend to react with known molds. Many different alloys containing rare earth elements such as yttrium or lanthanum also tend to react with known molds. It is contemplated that molds constructed in accordance with the present invention can be advantageously used during the casting of the foregoing and other reactive metals.

The Slurry

The improved slurry of the present invention is formed by mixing an aqueous based binder with yttria and a source of hydroxyl ions. Immediately after mixing, the slurry has a very high pH. However, the pH of the slurry quickly decreases (FIG. 1). Within a short time, for example six days, the pH of the slurry will have decreased and become relatively stable.

As a result of experimentation, it is believed that when the hydroxyl ion source is sufficient to prevent premature gelation of the a slurry, the slurry has a pH of more than 10.2 six days after initially mixing the slurry. However, when the hydroxyl ion source is very weak, the slurry completely or partially gels within six days after initially mixing the slurry. Other slurries having a somewhat greater, but still inadequate, hydroxyl ion source, settled and gelled to the extent that they could not be readily dispersed after six days. In some of these slurries, localized gelation occurred. This gelation may tend to occur in the liquid on top of the slurry after the slurry has settled. The slurries which gelled due to an inadequate hydroxyl ion source could not be used to make satisfactory molds for the casting of reactive metals.

Aqueous based slurries containing refractory materials and yttria along with an adequate source of hydroxyl ions do not gel over extended time periods. Thus, tests have shown that slurries having a pH of more than 10.2 six days after mixing do not gel more than five months after being initially mixed. If a slurry having an adequate source of hydroxyl ions is allowed to set for a day or so without being agitated, the solid materials in the slurry tend to settle to the bottom of the slurry. However, these solid materials can be readily redispersed with a minimum of mixing. Such a slurry will keep almost indefinitely.

The ability of a slurry to resist gelation enables a large body of the slurry to be formed and to be used over an extended time period. Thus, a slurry which resists gelation can be mixed and then used for several months during the sequential forming of a substantial number of molds and/or cores. The ability of a slurry to resist premature gelation is an important characteristic in the operation of a commercial foundry. This is because it is desirable to mix a relatively large body of the slurry and use the slurry over an extended time period. If the initial body of slurry becomes depleted, additional slurry materials may be added.

Although it is difficult to be certain, it is theorized that the source of hydroxyl ions in the improved slurry of the present invention acts as a hydration suppressant. By suppressing hydration, the hydroxyl ions prevent premature gelation of the slurry. It is believed that the hydroxyl ions may interact with the yttria in the slurry to prevent surface hydration of the yttria and resulting premature gelation of the slurry.

The Mold

Molds formed in accordance with the present invention have surfaces formed from the previously described slurry. Although entire molds, cores, crucibles, and/or crucible liners could be formed from the slurry, it is preferred to use the slurries to form mold facecoats and core coatings. Of course, the slurries could be used to form any desired surface associated with the casting of a reactive metal. To form a mold, a wax pattern having a configuration corresponding to a desired mold cavity is dipped in the previously described slurry. This slurry contains water, a refractory binder, yttria and a source of hydroxyl ions sufficient to cause the slurry to have a pH of 10.2 or more six days after being initially mixed.

The wet coating of slurry is at least partially dried to form a covering over the pattern. The pattern can be repetitively dipped to build up a facecoat of a desired thickness.

After an initial coating or coatings have been applied to form the facecoat, the pattern is dipped in either the same slurry or a different slurry. These subsequent coatings of slurries may be stuccoed with refractory materials in a known manner. The dipping and stuccoing steps are repeated until a mold wall of a desired thickness has been built up behind the facecoat.

After dewaxing to remove the pattern, the mold is fired at approximately 2,000° F. When the improved slurry of the present invention is used to form the facecoat, the mold does not crack or spall during firing. It is believed that this is due to the interaction of the hydroxyl ions with the yttria and the lack of hydration of the yttria.

If the slurry of the present invention is used to form a core, a base having a configuration which corresponds to the general configuration of the core is formed. This base is repetitively dipped in the aqueous based refractory slurry of the present invention. Thus, the base for the core is repetitively dipped in a slurry containing water, a refractory binder, yttria and a source of hydroxyl ions sufficient to cause the slurry to have a pH of 10.2 or more six days after being initially mixed. This results in the forming of a coating containing yttria, on the outside of the core. The core is then fired.

The core is subsequently positioned in a mold. The mold cavity in which the core is disposed may have a facecoat formed in the manner previously explained from the slurry of the present invention. In such a mold, both the face coat of the mold and the coating on the core are formed by the slurry of the present invention. However, the mold and core could be used separately if desired.

The source of hydroxyl ions in the slurry is sufficient to prevent gelation of the slurry for many months after the slurry is initially mixed. Therefore, the slurry can be used over a substantial length of time to sequentially form molds. This allows a large body of slurry to be formed and used over an extended time period to form molds during operating a foundry. In addition to being used to form cores and/or molds, the slurry may be used in the formation of liners or crucibles.

Casting

After a mold formed in accordance with the present invention has been preheated, the reactive metal which is to form a cast article is poured into the mold. The molten reactive metal engages the inert mold facecoat and/or core coat formed in the manner previously described. Due to the presence of the yttria, no reaction occurs between the molten metal and the mold. The result is a defect free casting formed of the reactive metal.

Although many different reactive metals could be utilized, in one specific instance, the reactive metal was a nickel-chrome superalloy containing yttrium. Specifically, the superalloy was General Electric Company N-5 single crystal alloy. This alloy is a proprietary nickel base superalloy of the general type disclosed in U.S. Pat. No. 4,719,080.

After this molten metal had solidified in the mold constructed in accordance with the present invention, the resulting single crystal casting was of good quality and contained at least 20 parts per million of yttrium throughout the casting. Some uncored castings have had a yttrium retention of as high as 1,500 parts per million.

Previous attempts to cast single crystal articles of N-5 alloy with known alumina facecoat molds, that is with molds which do not have a facecoat made with the slurry of the present invention, resulted in castings having far less than 20 parts per million of yttrium in the upper portions of the castings. However, the lower portions of the castings made in these prior art molds did contain a relatively large amount of yttrium. Thus, there was an extremely uneven distribution of yttrium in the castings. Of course, this uneven distribution of yttrium made the castings unsuitable for their intended purposes.

It is theorized that the uneven distribution of yttrium in the castings made with prior art molds was the result of the molten metal at the lower ends of the molds solidifying before the yttrium had a chance to react with the molds. However, solidification of the molten metal occurred slowly enough in the remainder of the molds to provide time for the yttrium in the alloy to react with the materials in the molds. Regardless of the reason, castings of General Electric N-5 single crystal alloy made in the molds of the present invention contained at least 20 parts per million of yttrium throughout the castings and were of good quality. Thus, the castings were free of defects and had good surface hardness. In some castings there were more than a 1,000 parts per million of yttrium throughout the castings.

Although the foregoing description of a casting made in a mold constructed in accordance with the present invention was of a nickel-chrome superalloy containing yttrium, other alloys could be cast in the mold. Thus, other superalloys could be cast. In addition, titanium and its alloys may be cast in molds formed in accordance with the present invention.

Gellation

Gellation tests were conducted on various aqueous based slurries formed in accordance with the present invention. The tests were performed on slurries containing −325 mesh yttria powder with a commercially available, fine particle size, grade of colloidal silica sold under the tradename of Nalcoag 1130 (trademark). The colloidal silica had the nominal properties listed below:

| Colloidal silica, as $SiO_2$ | 30% |
| pH | 10.0 |
| Average particle size | 8 mu |
| Average surface area | 275 m$^2$/gram |
| Specific Gravity | 1.214 |
| Viscosity | less than 10 cp |
| $Na_2O$ | 0.70% |

This grade of colloidal silica ($SiO_2$) is widely used for the forming of molds for investment castings.

Seven gelation tests were run on various slurries containing different amounts of a source of hydroxyl ions specifically, sodium hydroxide. Thus, amounts of sodium hydroxide ranging from 0 to 6.43 grams were dissolved in 228ml portions of distilled water. To this solution, 100ml colloidal silica (Nalcoag 1130) was added slowly and stirred vigorously. Once this had been done, 50ml portions of each solution were taken and mixed with 192 grams of −325 mesh yttria powder to make a slurry of dipping consistency. Thus, the seven samples of slurry differed from each other only in the amount of sodium hydroxide present in the slurry.

The slurries were set aside in closed glass jars and examined periodically over a time period of more than five months. The tests results were as follows:

| Sample Number | Grams NaOH to 228 ml $H_2O$ | $SiO_2/Na_2O$ Equivalent Dry Wt. Ratio | Observations |
|---|---|---|---|
| 1 | None | 42.8/1 | Gelled within 5 days |
| 2 | 0.19 | 35/1 | After six days had settled and could not be readily redispersed. However, liquid on top was not gelled. |
| 3 | 0.36 | 30/1 | Same |
| 4 | 0.61 | 25/1 | After six days, had settled, but could be readily redispersed. |
| 5 | 0.97 | 20/1 | Same |
| 6 | 2.79 | 10/1 | Same |
| 7 | 6.43 | 5/1 | Same |

The $SiO_2/Na_2O$ equivalent dry weight ratios set forth above take into account both the $Na_2O$ in the colloidal silica and the equivalent $Na_2O$ added as NaOH. The manner in which the pH of the aforementioned seven samples and two additional samples varied with time is illustrated by the Graph of FIG. 1.

More than five months after being initially mixed, the seven slurry samples appeared to be in the same condition as after six days. The effect of the increased alkali, as measured by the $SiO_2/Na_2O$ equivalent dry weight ratio, in extending the life of the slurries is clearly evident. Thus, when the slurry had a weight ratio of refractory ($SiO_2$) to sodium oxide (or equivalent alkali) of less than thirty-to-one, premature gelation of the slurry did not occur. In addition, when the solid components settled out, they could be readily redispersed.

The relationship of the pH of the seven sample slurries and two additional slurries is illustrated by the graph of FIG. 1. The test sample having a $SiO_2/Na_2$ equivalent dry weight ratio of 42.8-to-1 and the slurry with a ratio of 35-to-1 (sample Nos. 1 and 2) both had a pH of less than 10 six days after being initially formed. Both of these slurries are unsatisfactory for use in forming molds. Thus, premature gelation of the slurry having a $SiO_2/Na_2O$ equivalent dry weight ratio of 42.8-to-1 occurred after six days. The slurry with a $SiO_2/Na_2O$ equivalent dry weight ratio of 35-to-1 experienced premature gelation to the extent that it settled within six days and could not be redispersed. In addition, the slurry having an $SiO_2/NaO_2$ equivalent dry weight ratio of 30-to-1 had a pH of less than 10.2 after six days and experienced premature gelation to the extent that it settled and could not be redispersed. Due to their premature gelation tendencies, these slurries are all unsatisfactory for use in forming molds and/or cores.

The slurries having a $SiO_2/Na_2O$ equivalent dry weight ratio of less than 30-to-1 and a pH of more than 10.2 six days after being initially mixed did not experience premature gelation. Thus, when the particles of these slurries settled, they could be readily redispersed by agitating the slurry. Therefore, these slurries were satisfactory for forming molds, cores, crucibles, crucible liners, and/or other surfaces associated with the casting or reactive metals.

The aforementioned silicon oxide to sodium oxide ($SiO_2/Na_2O$) equivalent dry weight ratio refers to the ratio of silicon oxide to alkali. The alkali is present in a quantity sufficient to supply hydroxyl ions in an amount corresponding to the indicated dry weight of sodium oxide when the sodium oxide is mixed with water. Thus, even though the alkali is expressed as being sodium oxide, the alkali could be supplied as a metal hydroxide or an organic hydroxide. Regardless of the chemical composition of the source of hydroxyl ions, the ratio of the amount of silicon oxide to the hydroxyl ion source is sufficient to provide a quantity of hydroxyl ions, when mixed with water, corresponding to the expressed amount of dry sodium oxide when mixed with water.

From the graph in FIG. 1, it is clear that when the slurries were initially mixed they all had a relatively high pH. The initially high pH quickly decreased and, with the passage of time, stabilized. The slurries which were suitable for forming molds and/or cores, that is, the slurries with an $SiO_2/Na_2O$ equivalent dry weight ratio of less than 30-to-1, had a pH of more than 10.2 after sufficient time, that is, six days, had passed for the pH level to stabilize.

The samples depicted in the graph of FIG. 1 were held in closed glass bottles. After the test results shown in FIG. 1 had been obtained, it was realized that the pH might be influenced by having the samples in glass bottles. Therefore, in tests for selected samples, that is samples having an $SiO_2/Na_2O$ equivalent dry weight ratios of 4.28 to 1; 20.0 to 1; and 2.36 to 1, were repeated using closed plastic bottles to hold the test samples. The samples were formed in the same method as previously described.

A comparison of the test results with glass and plastic bottles is shown in the graph of FIG. 2. After six days, it should be noted that the samples in the plastic bottles had a pH which was about 0.2 higher than the same slurries in glass bottles. It is believed that the reduced pH of the slurries in the glass bottles was due to the hydroxyl ions attacking the glass.

As a result of these gelation tests, it was concluded that slurries having a silica ($SiO_2$) to sodium oxide ($Na_2O$) dry weight equivalent ratio of 30 to 1 or more and a pH of less than 10.2 six days after being initially mixed would be unsatisfactory for use in forming molds due to premature gelation. The slurries having a silica to sodium oxide dry weight equivalent ratio of less than 30-to-1 and a pH of more than 10.2 six days after being initially mixed are satisfactory for use in forming molds and are not subject to premature gelation. The maximum pH for the samples, at the end of six days, was less than 11.5.

In another gelation test, 100ml of distilled water was added to 131ml of an aqueous solution containing 40% tetramethyl ammonium hydroxide. Thereafter, 100ml of Nalcoag 1130 (trademark) colloidal silica was added with vigorous stirring. After mixing, 50ml of the resulting solution was mixed with 192 grams of −325 mesh yttria powder. Six days after initial mixing, the slurry had a pH of more than 10.2. The slurry was then set aside and observed for more than two and a half months. When the slurry settled, it was easily dispersed.

The graph of FIG. 1 is for slurries having sodium oxide ($Na_2O$) as a hydroxyl ion source. However, it is contemplated one or more other sources of hydroxyl ions could be used if desired. Therefore, a common basis for comparison of organic and inorganic hydroxides is required. It is believed that this can be done by expressing the various hydroxides in molar terms.

The relationship between moles of the sodium oxide ($Na_2O$) referred to in the graph of FIG. 1 and moles of sodium hydroxide (NaOH) is given by $$Na_2O + H_2O \rightarrow 2NaOH.$$

Therefore, one mole of sodium oxide yields two moles of the hydroxyl ion source (NaOH) when the sodium oxide is mixed with water.

The graph of FIG. 1 indicates that the slurries which were suitable for forming molds and/or cores had an $SiO_2/Na_2O$ equivalent dry weight ratio of less than 30-to-1. This corresponds to a molar ratio of silicon oxide (colloidal silica) to hydroxyl ion source of less than approximately 15.5-to-1. Therefore, the molar ratio of silicon oxide (colloidal silica) to the source of hydroxyl ions of the slurries which were suitable for forming molds and/or cores had an $SiO_2/NaOH$ molar ratio less than 15.5-to-1.

In determining the $SiO_2/NaOH$ molar ratio of the suitable slurries it is necessary to determine the molar ratio of a 30-to-1 dry weight ratio of $SiO_2/Na_2O$. Silicon oxide ($SiO_2$) has a molecular weight of approximately 60.08. Therefore, thirty grams of silicon oxide is equal to approximately 0.4993 moles of silicon oxide.

Sodium oxide ($Na_2O$) has a molecular weight of approximately 61.98. Therefore, one gram of sodium oxide is equal to approximately 0.01613 moles of silicon oxide. However, one mole of sodium oxide yields two (2) moles of sodium hydroxide (NaOH) when mixed with water to form a hydroxyl ion source. Thus, $$Na_2O + H_2O \rightarrow 2\ NaOH.$$

Therefore, one gram of sodium oxide is a hydroxyl ion source which is equivalent to approximately 0.03226 moles of NaOH.

The molar ratio of silicon oxide ($SiO_2$) to a hydroxyl ion source (NaOH) corresponding to a 30-to-1 dry weight ratio of silicon oxide (colloidal silica) to sodium oxide ($Na_2O$) is approximately 15.5-to-1. Thus, thirty (30) grams of silicon oxide (colloidal silica) is 0.4993 moles and one (1) gram of sodium oxide is equivalent to 0.03226 moles of a sodium hydroxide source of hydroxyl ions. The ratio of moles of silicon oxide to moles of sodium hydroxide is 0.4993/0.03226 or approximately 15.5-to-1. Therefore, the graph of FIG. 1 indicates that slurries which are suitable for forming molds and/or cores and having a pH of more than 10.2 after six days, have a silicon oxide to hydroxyl ion source molar ratio of less than 15.5-to-1.

As a result of experimentation, it has been determined that the various slurries seem to have some sensitivity to the ambient atmosphere. It is believed that this may be due to the absorption of carbon dioxide of the atmosphere, forming a carbonate salt in solution which tends to gel the colloidal silica. Regardless of the reason, when the slurry is exposed to the ambient atmosphere, there is a greater tendency for the slurry to gel when it is exposed to the atmosphere than when the slurry is maintained in a closed container.

When the slurry is stirred continuously in open air at a rate sufficient to keep the refractory in suspension, the slurry gels in a shorter time than one which is exposed to the atmosphere and only occasionally stirred. When the slurry is exposed to the atmosphere and only stirred occasionally when it is desired to redisperse the refractory, the slurry gels in a shorter time than one which is stirred in a closed container. Thus, by keeping the slurry in a closed container so that the slurry is not exposed to the ambient atmosphere, any tendency for the slurry to gel is minimized.

The tendency for the slurry to gel sooner when the slurry is exposed to the atmosphere does not appear to be related to the pH of the slurry. Thus, if two identical slurries are continuously stirred with one of the slurries in an open container and the other slurry in a closed container, the slurry in the open container will tend to gel first. This is true even though the pH of the slurry in the open container is higher than the pH of the slurry in the closed container. Therefore, it is preferred to maintain the slurry in a closed container and to expose the slurry to the ambient atmosphere only when it is desired to remove slurry from the container.

Examples

A larger amount of the previously described aqueous based slurry containing 40% tetraethyl ammonium hydroxide and Nalcoag 1130 (trademark) colloidal silica was formed. Patterns for turbine engine blades were dipped in the slurry and stuccoed with 90 mesh fused aluminum oxide. After two hours of air drying, the patterns were again dipped and stuccoed with the 90 mesh fused aluminum oxide.

The patterns to which the two layer facecoat was applied in the manner previously explained were then assembled into a production size cluster along with patterns having other experimental facecoats. Additional coats of a conventional, non-yttria containing slurry, were applied in a normal manner to complete the shell molds. After dewaxing in a steam autoclave, firing of a mold at 2,000° F. to burn residual pattern material, the yttria facecoat was inspected. The facecoat was found to have good surface hardness and to be free of cracking spalling.

Single crystal castings of a reactive metal were successfully made in the mold having the two layer facecoat from an aqueous slurry containing tetraethyl ammonium hydroxide in the manner previously explained. Thus, the molds were placed on a water cooled copper chill plate inside a vacuum furnace. The molds were preheated to 2,800° F. Molten reactive metal, specifically General Electric Company N-5 (trademark) single crystal alloy at a temperature of 2,775° F. was poured into the mold. The molten metal engaged the yttria containing facecoat. After pouring, the mold was withdrawn from the hot zone of the furnace over a period of 71 minutes. The resulting single crystal castings were free of defects and there was a relatively uniform dispersion of yttrium throughout the casting.

Another similar successful aqueous based slurry was used as a facecoat to make full production size molds for single crystal castings. This slurry was composed of:

| Water | 4.44 kg |
| --- | --- |
| Tetramethyl ammonium hydroxide (25% aqueous solution) | 2.00 kg |
| Colloidal silica (Nalcoag 1130) | 6.44 kg |
| Yttria powder minus −325 mesh | 52.84 kg |
| Wetting agent | 37.4 grams |
| Antifoam | 46 grams |

Single crystal castings of a reactive metal were successfully made in these molds. The reactive metal was General Electric N-5 (trademark) single crystal alloy which was poured after preheating the mold in the manner previously explained.

Although the molds containing an organic hydroxide source of hydroxyl ions, that is, tetraethyl ammonium hydroxide and tetramethyl ammonium hydroxide, were used to cast a nickel-chrome superalloy containing yttrium, the molds could be used to cast other reactive metals. For example, the molds could be used to cast nickel-chrome superalloy containing a reactive element other than yttrium. The molds could be used to cast titanium and titanium alloys or other known reactive metals. In addition to molds, the slurry of the present invention may be used in the formation of cores, crucibles and liners.

Titanium alloy (Ti6A14V) castings have also been made in improved molds which were formed using the slurry of the present invention. The castings were made in a stepped wedge configuration with five flat surface areas and five radii between surface areas. In a first casting, the radii and flat surface areas had a maximum continuous alpha case of 0.003 inches and a maximum alpha case spike of 0.003 inches. In a second casting, having the same configuration as the first castings, the radii had a maximum continuous alpha of 0.003 inches and a maximum alpha case spike of 0.006 inches. In the second casting, the flat surface areas had a maximum continuous alpha case of 0.007 inches and a maximum alpha case spike of 0.0025 inches.

The improved slurry used a colloidal silica binder having a silica content on a dry weight basis of 2.0 wt% and latex solids on a dry weight basis of 2.0 wt%. The composition of the slurry was:

| Processed Alpha Flour (325 mest presintered yttria flour) | 980.0 g |
| --- | --- |
| Ludox SM Colloidal Silica | 67.0 g |
| Dow 308A Latex | 40.0 g |
| Tetraethylammonium Hydroxide (40% in $H_2O$) | 22.4 g |
| Water (Deionized) | 50.0 g |
| Niacet 7 | 2.0 ml |
| Antifoam DB 110A | 5 drops |

Zahn (#4) = 1:24.24 at 71.2° F.
pH = 12.06

Stepped wedge wax patterns were dipped in the slurry having the composition set forth above to form prime coats over the patterns. The prime coats were stuccoed with white fused alumina. The wet molds were dried at a temperature of 70° F. and a 50% relative humidity for approximately twelve hours.

Second and third dips of alumina in ethyl silicate were applied over the stuccoed prime coats. The second and third dips were stuccoed with white fused alumina. Backup coats of colloidal silica bonded zircon were applied and stuccoed with white fused alumina.

The molds were dewaxed in an autoclave. The molds were fired to 2,000[F during the casting preheat cycle. Molten titanium +6 aluminum +4 vanadium alloy was poured into the hot molds in a vacuum furnace. The resulting castings were of good quality and had the aforementioned alpha case.

Conclusion

In view of the foregoing description, it is apparent that the present invention provides a slurry formed from an aqueous binder and yttria. The slurry contains a source of hydroxyl ions. The source of hydroxyl ions prevents premature gelation of the slurry and results in the slurry having a pH of at least 10.2 six days after the slurry is initially mixed. The dry weight ratio of the binder to the source of hydroxyl ions is equivalent to a silicon oxide ($SiO_2$) to sodium oxide dry weight ratio of less than thirty-to-one (30:1). It has been determined that the slurry may be maintained for many months with only periodic agitation to maintain the solid particles of the slurry in suspension.

Defect free molds containing surface areas formed from the slurry can be made. These molds can withstand firing at high temperatures without spalling or cracking. It is theorized that the source of hydroxyl ions is effective to suppress hydration of the yttria in the slurry to thereby prevent premature gelation of the slurry and to prevent the forming of defects in a surface formed from the slurry during drying and/or firing of the surface.

The slurry which is formed in accordance with the present invention may be used to form a mold containing a surface area which is exposed to a reactive metal during casting. This surface area may be on an inner side surface of the mold, or on an outer side surface of a core disposed in the mold, or on a crucible or crucible liner. When a reactive molten metal is conducted into the mold, it engages the surface area formed from the slurry. However, due to the presence of the relatively inert yttria, there is no reaction between the metal and the surface area formed from the slurry.

Having described specific preferred embodiments of the invention, the following is claimed:

1. A method of casting an article of a reactive metal, said method comprising the steps of forming a slurry containing water, a binder, a source of hydroxyl ions, and yttria, said source of hydroxyl ions being sufficient to result in said slurry having a pH of at least 10.2 six days after initially mixing the slurry, forming a mold containing a surface area formed from the slurry, and conducting a molten reactive metal into the mold, said step of conducting a molten reactive metal into the mold including engaging the surface area formed from the slurry with the molten reactive metal.

2. A method as set forth in claim 1 wherein said step of forming a mold containing a surface area formed from the slurry includes forming the mold with a facecoat formed from the slurry.

3. A method as set forth in claim 1 wherein said step of forming a mold containing a surface area formed from the slurry includes forming a core having an outer side surface area formed from the slurry.

4. A method as set forth in claim 1 wherein said step of forming a mold is performed more than six days after initially mixing the slurry.

5. A method as set forth in claim 1 wherein the source of hydroxyl ions in the slurry is a metal alkali.

6. A method as set forth in claim 1 wherein the source of hydroxyl ions is an organic hydroxide.

7. A method as set forth in claim 1 wherein the dry weight ratio equivalent of binder to sodium oxide in the slurry is less than thirty-to-one.

8. A method as set forth in claim 1 wherein the binder is silica.

9. A method as set forth in claim 1 wherein the binder and source of hydroxyl ions is a colloidal silica stabilized with an alkali.

10. A method of casting a plurality of articles of reactive metal in a plurality of molds, said method comprising the steps of initially forming a large body of a slurry containing water, a binder, a source of hydroxyl ions and yttria, sequentially forming a plurality of molds containing surface areas formed from the slurry more than six days after performing said step of initially forming the large body of slurry, and conducting molten reactive metal into each of the plurality of molds, said step of conducting a molten reactive metal into each of the plurality molds includes engaging the surface areas formed from the slurry with molten reactive metal in each of the molds.

11. A method as set forth in claim 10 further including the step of stirring the body of slurry more than six days after initially forming the slurry to maintain the solid components of the slurry suspended in the water of the slurry.

12. A method as set forth in claim 10 wherein the source of hydroxyl ions in the slurry is sufficient to result in the slurry having a pH of at least 10.2 six days after initially mixing the slurry.

13. A method as set forth in claim 10 wherein said step of sequentially forming a plurality of molds from the slurry in the large body of slurry includes forming at least one of the molds more than twenty days after performing said step of initially forming the large body of slurry.

14. A method as set forth in claim 11 further including the step of maintaining the slurry in a closed container during the time between the forming of the molds of the plurality of molds.

15. A method as set forth in claim 10 wherein said step of forming a plurality of molds containing surface areas formed from the slurry in the large body of slurry includes forming the molds with facecoats formed from the slurry.

16. A method as set forth in claim 10 wherein said step of forming a plurality of molds containing surface areas formed from the slurry in the large body of slurry includes forming cores having outer side surface areas formed from the slurry.

17. A method as set forth in claim 10 wherein the source of hydroxyl ions in the slurry is a metal alkali.

18. A method as set forth in claim 10 wherein the source of hydroxyl ions in the slurry is an organic hydroxide.

19. A method as set forth in claim 10 wherein the dry weight ratio of the binder to the source of hydroxyl ions is equivalent to a silicon oxide ($SiO_2$) to sodium oxide ($Na_2O$) dry weight ratio of less than thirty-to-one (30:1).

20. A method as set forth in claim 10 wherein the slurry has a pH of more than 10.2 and less than 11.5 six days after initially mixing the slurry.

* * * * *